United States Patent [19]

Gagnepain

[11] Patent Number: 4,926,521

[45] Date of Patent: May 22, 1990

[54] ERGONOMIC HANDLE FOR A KITCHEN ARTICLE

[75] Inventor: Didier Gagnepain, Tournus, France

[73] Assignee: Terraillon, societe anonyme, Annemasse, France

[21] Appl. No.: 236,021

[22] Filed: Aug. 23, 1988

[30] Foreign Application Priority Data

Sep. 8, 1987 [FR] France ................................ 87 12659

[51] Int. Cl.⁵ .............................................. A47J 45/06
[52] U.S. Cl. .................................. 16/110 A; 16/114 A;
  16/DIG. 12; 220/94 R; D7/361; D7/395
[58] Field of Search ............ 16/110 A, 111 R, 114 R,
  16/114 A, 116 R, DIG. 12, DIG. 18, DIG. 19;
  81/177.1; 74/551.9; 272/68; 220/94 R;
  273/81.4, 75; D7/361, 395

[56] References Cited

U.S. PATENT DOCUMENTS

| D. 143,164 | 12/1945 | Ramsthal | D7/361 |
| D. 143,568 | 1/1946 | Wemyss | D7/395 |
| D. 149,607 | 5/1948 | Beck | D7/395 |
| D. 165,917 | 2/1952 | Hampshire | D7/395 |
| D. 189,685 | 1/1961 | Rudebeck | D7/395 |
| 2,345,248 | 3/1944 | Farber | 16/111 R |
| 4,038,719 | 8/1977 | Bennett | 16/110 R |

FOREIGN PATENT DOCUMENTS

| 240225 | 10/1987 | European Pat. Off. |
| 3400005 | 7/1985 | Fed. Rep. of Germany . |
| 909352 | 5/1946 | France . |
| 369888 | of 1932 | United Kingdom . |
| 422254 | 1/1935 | United Kingdom . |

Primary Examiner—Nicholas P. Godici
Assistant Examiner—Edward A. Brown
Attorney, Agent, or Firm—Ratner & Prestia

[57] ABSTRACT

An ergonomic handle for a kitchen article is provided permitting three distinct holding positions. For that, on its lower face, it has a first transverse groove and a second transverse groove spaced apart from each other and, on its upper face, an upper housing. The handle is formed of two successive non aligned sections.

8 Claims, 2 Drawing Sheets

ERGONOMIC HANDLE FOR A KITCHEN ARTICLE

BACKGROUND OF THE INVENTION

The present invention relates to handles for handling kitchen articles such as saucepans, braising pans or frying pans.

The U.S. Pat. No. 2 345 248 describes a kitchen article handle in which the lower face of the handle has a central concave part in the form of an arc defining a transverse housing in which four fingers may be accommodated. Accommodation is provided for the thumb on a lateral handle face. Such a handle is adapted to a grip in which the thumb is on the side of the handle. The forces required for holding the kitchen article are borne partially by the friction forces of the fingers on the side faces of the handle. The result is that holding the kitchen article requires appreciable force to produce said lateral friction, and the wrist is in an orientation which is not favorable for making tipping movements with a transverse axis.

The present invention has more particularly as an object to substantially improve the grip of the hand of the user on the kitchen article handle and to make this grip adapted to particular forces which appear between the hand of the user and the handle during movements which are imparted to the kitchen article during its normal use.

According to another object of the invention, the handle of the invention may be held in several ways, each way being adapted to a particular use of the kitchen article in a first holding position, the hand is relatively close to the kitchen article itself, so that holding accuracy is increased and the force required for carrying the kitchen article by the handle is reduced.

In a second position, the hand is spaced slightly away from the kitchen article body.

In a third position, the hand is very much removed from the kitchen article, and is thus protected from projections of food when cooking over a high heat.

In all positions of use, the hand adapts itself perfectly well to the particular shape of the handle of the invention, and this particular shape opposes the relative sliding of the handle and of the hand both in the longitudinal direction of the handle, and in the direction of axial rotation of the handle.

Furthermore, the shape of the handle of the invention is particularly well adapted to the use in which, for each of the positions of use, the user disposes his thumb longitudinally on the upper face of the handle, and his other fingers in opposition transversely under the lower face of the handle. It can be seen that the hand is thus in an optimum position for supporting and countering the forward tipping force imparted by the mass contained in the body of the kitchen article: the wrist joint is naturally disposed in an orientation making it possible to limit downward tipping of the kitchen article without muscular effort as well as making possible an appreciable angular movement of the joint to impart on the kitchen article upward tipping movements with transverse axis. The forces for holding the kitchen article are borne by the compression forces of the fingers on the upper and lower faces of the handle.

SUMMARY OF THE INVENTION

To attain these objects as well as others, the handle of the invention comprises an elongate body, ending in a first end or attachment end providing connection of the handle with the kitchen article body and ending in a second end or free end; the handle comprises, on its lower part, a first transverse groove with rounded edges disposed at a small distance from the first end of the handle, this groove is formed so as to permit transverse engagement of a finger of the user; the handle has on its lower face a second transverse groove with rounded edges spaced apart from the first transverse groove in the direction of the second handle end, the second groove is intended to permit transverse engagement of a finger of the user.

The spacing between the first and second transverse grooves is advantageously greater than the normal transverse spacing between the little finger and the forefinger of the same hand of the user when the fingers are touching.

In a particular embodiment, the second transverse groove is spaced from the second end of the handle by a distance between 3 and 8 centimeters. Thus, the user may hold the handle with his forefinger engaged in the second transverse groove, whereas the second end of the handle is accommodated in the hollow of his hand.

The handle of the invention advantageously comprises a first handle section, included between the first handle end and the second transverse groove and a second handle section between the second handle end and the second transverse groove. The first and second handle sections are not aligned with each other and form therebetween a non flat angle. This angle may advantageously be between 10° and 20°.

BRIEF DESCRIPTION OF THE DRAWINGS

Other objects, characteristics and advantages of the present invention will be clear from the following description of particular embodiments, with reference to the accompanying figures in which.

DETAILED DESCRIPTION OF THE INVENTION

Figure 1:
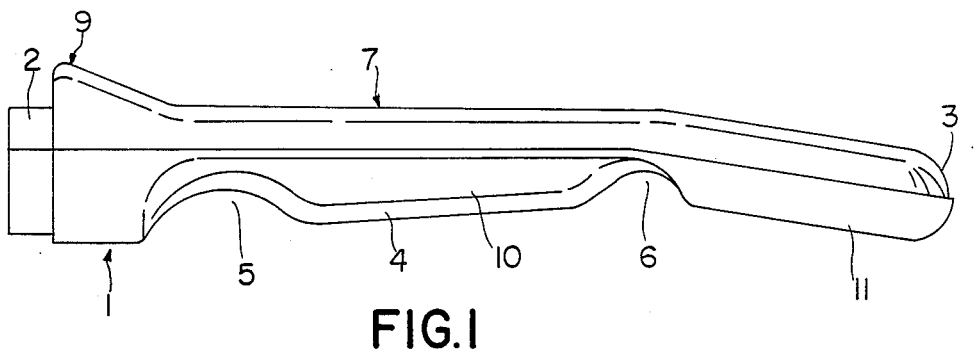
FIG. 1 shows a side view of a handle in accordance with the present invention.
Figure 2:
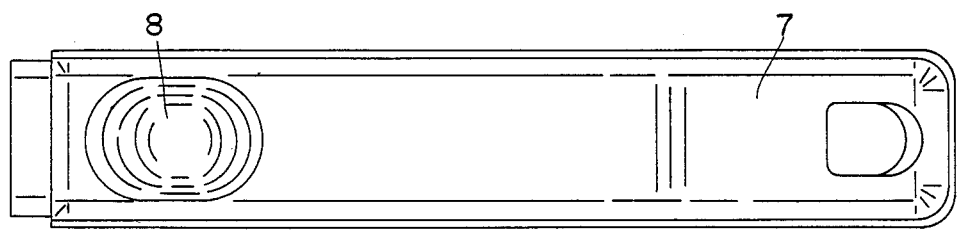
FIG. 2 shows a top view of the handle of FIG. 1.
Figure 3:
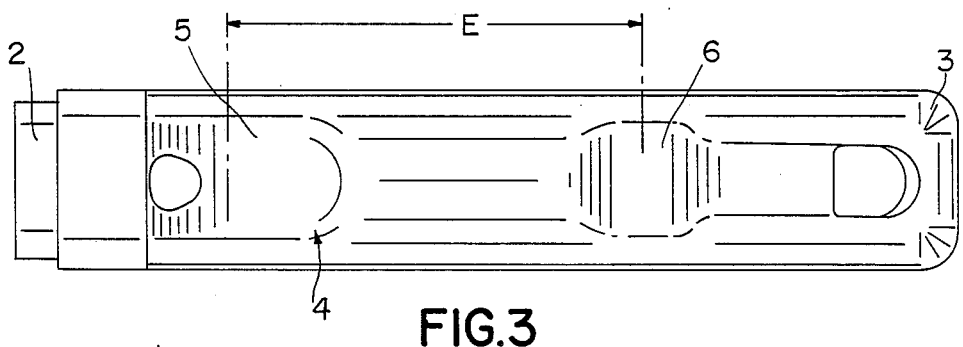
FIG. 3 shows a bottom view of the handle of FIG. 1.

In the embodiment shown in FIGS. 1 to 3, a handle 1 comprises an elongate body, ending in a first end 2 or attachment end, formed so as to be fitted and fixed on a kitchen article not shown. The handle ends oppositely in a second end or free end 3.

The lower face 4 of the handle comprises a first transverse groove 5, with rounded edges, disposed at a small distance from the first end 2 of the handle; the handle has on its lower face 4 a second transverse groove 6 with rounded edges spaced apart from the first transverse groove in the direction of the second handle end 3.

The spacing E between the first 5 and second 6 transverse grooves, or distance separating the bottom of the grooves, is advantageously between about 7 and 9 cm.

Thus, this spacing E is greater than the mean distance between the little finger and the forefinger of the same hand of a normal user, when his fingers are touching.

In the embodiment shown in the figures, the transverse grooves 5 and 6 advantageously have a cylindrical shape with semi-circular section, the dimension of the section being just sufficient to permit accommodation of a finger, as shown in the drawings.

The upper face 7 of the handle comprises a housing 8 substantially opposite the first groove 5. Housing 8, in the embodiment shown, is an elliptical recess for accommodating the end of a thumb of the user. The upper housing 8 is slightly offset in the direction of the first handle end 2 with respect to the first transverse groove 5, as shown in the figures. It will be noted in FIG. 1 that, in the vicinity of the first end 2 of the handle, the upper face 7 has a raised nose portion 9, providing spacing of the thumb with respect to the kitchen article. The raised portion 9 serves as thumb positioning limiter, so as to avoid any contact with the metal parts of the kitchen article which may possibly be hot.

Similarly, in the vicinity of the first end 2 of the handle, the lower face 4 of the handle has a recess for limiting the positioning of the fingers of the hand and avoiding any contact with the metal parts of the kitchen article which may possibly be hot.

In the embodiment shown in FIG. 1, the handle comprises two parts not aligned with respect to each other: a first handle section 10 included between the second transverse groove 6 and the first handle end 2 and a second handle section 11 between the second transverse groove 6 and the second end 3 of the handle. The first and second handle sections form therebetween a non flat angle, advantageously between 10° and 20°. As can be seen in the figure, the orientation of the handle sections with respect to each other is such that the lower faces of the first handle section 10 and second handle section 11 are brought close together.

The transverse section of the handle is advantageously flattened, and such that the width of the handle is greater than its height: the upper 7 and lower 4 faces are wider than the lateral faces of the handle.

The handle portion between the first transverse groove 5 and the second transverse groove 6 advantageously has a cross section whose form and size are substantially constant whatever the longitudinal position considered along the handle. The same goes for the handle portion between the second transverse groove 6 and the second end 3 of the handle.

When the handle is fixed to a kitchen article body, the lower face of the handle is oriented in the same direction as the lower face of the kitchen article In other words, the lower face of the handle is turned downwards when the kitchen article is placed flat on a horizontal plane.

Figure 4:
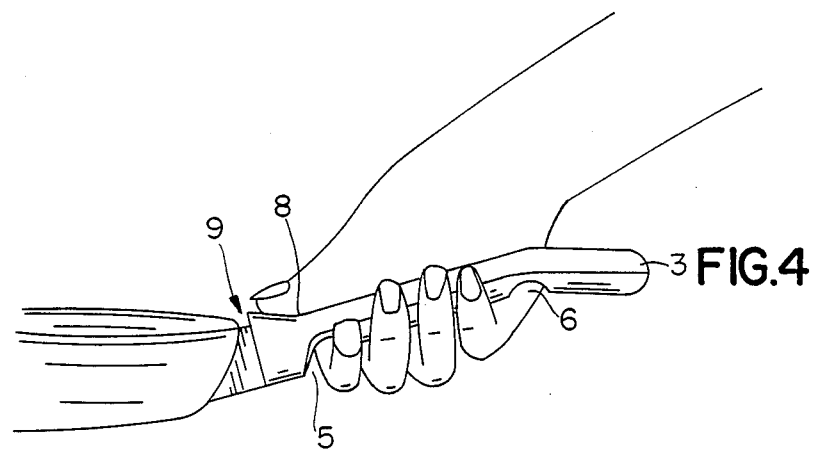
FIG. 4 shows a side view of a kitchen article fitted with a handle of the present invention, in a holding position in which the hand is close to the kitchen article.
Figure 5:
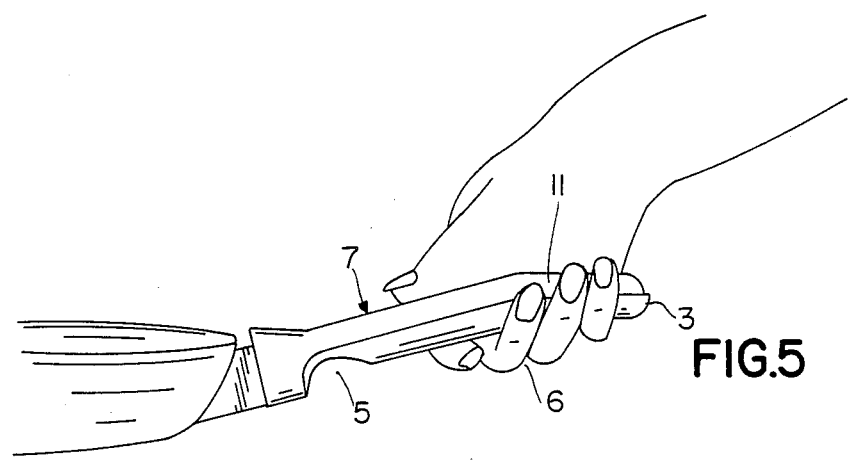
FIG. 5 is a side view of the kitchen article of FIG. 4, the hand being in an intermediate position.
Figure 6:
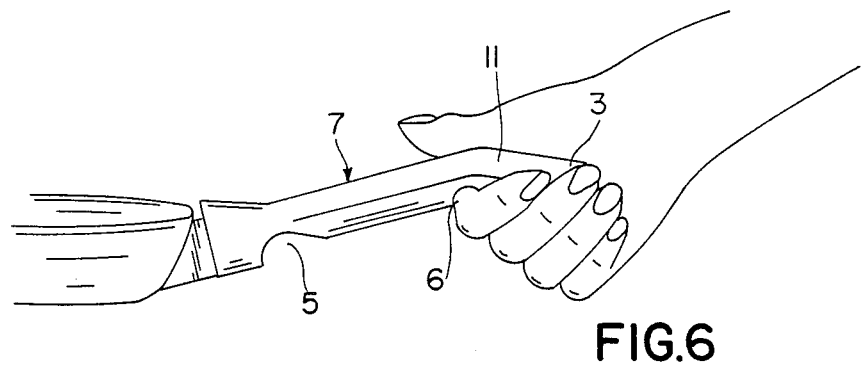
FIG. 6 is a side view of the kitchen article of FIG. 4, the hand being in a position remote from the kitchen article.

The use of a handle according to the present invention is illustrated in FIGS. 4 to 6.

In FIG. 4, the position of the hand is shown for taking the container off the cooking heat. In this position, the thumb is accommodated in housing 8, the forefinger is disposed transversely with respect to the handle and is accommodated in the first transverse groove 5 it can be seen that the little finger is in an intermediate position between the first transverse groove 5 and the second transverse groove 6, or engaged in the second groove 6. The hand is then in a close up position with respect to the kitchen article, which tends to reduce the force required for carrying it; closing in of the hand to the kitchen article is however limited both by the first transverse groove 5 and the upper housing 8 and the raised portion 9.

A kitchen article held by a hand disposed in an intermediate position is shown in FIG. 5. This position makes it possible to handle the container on the cooking heat during cooking. In this position, the third finger is accommodated in the second transverse groove 6 whereas the forefinger is in an intermediate position between the first transverse groove 5 and the second transverse groove 6. The thumb bears against the upper face of the handle and the second section 11 of the handle follows the hollow of the hand.

In FIG. 6 is shown the third position for holding the kitchen article with the handle of the present invention. This position is particularly well adapted for frying or browning foods in the case of using a frying pan. In this position, the forefinger is accommodated in the second transverse groove 6, the thumb bears against the upper face of the handle, and the second end 3 of the handle is accommodated in the hollow of the hand.

The present invention is not limited to the embodiments which have been explicitly described, but includes the different variants and generalizations thereof contained within the scope of the following claims.

WHAT IS CLAIMED IS:

1. A handle for a kitchen article, comprising an elongate body ending in a first attachment end providing connection of the handle with the kitchen article body and in a second free end, its lower face comprising a first transverse groove, with rounded edges, disposed at a small distance from the first end of the handle, wherein:

the first transverse groove has a section adapted for engagement of a finger of the user, the handle comprises a second transverse groove with rounded edges, spaced apart from the first transverse groove in the direction of the second end of the handle, for engaging a finger of the user, the spacing between the first and second transverse grooves is from about 7 to about 9 cm, said handle having a substantially constant cross-section between the free end and the second transverse groove, said handle comprising a first handle section between the second transverse groove and the first handle end and a second handle section between the second groove and the second handle end, the first and second handle sections forming an acute angle with respect to each other.

2. The handle as claimed in claim 1, wherein the second transverse groove is spaced from the second end of the handle by a distance between 3 and 8 cm, so that the user may hold the handle with his forefinger engaged in the second transverse groove, whereas the second end of the handle is accommodated in the hollow of his hand.

3. The handle as claimed in claim 1, wherein the angle between the first and second handle sections is between 10° and 20°.

4. The handle as claimed in claim 1, further comprising, on its upper face, an upper housing for accommodating the thumb of the user, the upper housing being slightly offset in the direction of the first handle end with respect to the first transverse groove.

5. The handle as claimed in claim 1, comprising a flattened cross section whose upper and lower faces are larger than their lateral faces.

6. A kitchen article, comprising a handle such as claimed in claim 1 attached to a kitchen article body.

7. The kitchen article as claimed in claim 6, wherein the handle is oriented with respect to the body of the kitchen article so that the lower face of the handle faces in the same direction as the bottom of the kitchen article body.

8. A handle for a kitchen article, said handle ending in a first attachment end providing connection of the handle with the kitchen article body and in a second free end, the lower face of said handle having two grooves, a first transverse groove and a second transverse groove, with rounded edges, each having a section adapted for engagement of a finger of the user, the first transverse groove is disposed at a small distance from the first end of the handle, the second transverse groove is from about 3 to about 8 from the second end of the handle, the spacing between the first and second transverse groove is from about 7 to about 9 cm, said handle having a substantially constant cross-section between the free end and the second transverse groove, said handle comprising a first handle section between the second transverse groove and the first handle end and a second handle section between the second groove and the second handle end, the first and second handle sections forming an acute angle with respect to each other.

* * * * *